United States Patent [19]

Niemelä et al.

[11] Patent Number: 4,934,397

[45] Date of Patent: Jun. 19, 1990

[54] PROCEDURE AND MEANS FOR CONTROLLING VOLUMETRIC FLOW RATE IN AIR-CONDITIONING INSTALLATIONS

[75] Inventors: Mertsi Niemelä, Kuusankoski; Raimo Lehtola, Kouvola; Kari Kakkonen, Kuusankoski, all of Finland

[73] Assignee: Halton Oy, Finland

[21] Appl. No.: 305,734

[22] PCT Filed: May 26, 1988

[86] PCT No.: PCT/FI88/00081

§ 371 Date: Jan. 27, 1989

§ 102(e) Date: Jan. 27, 1989

[87] PCT Pub. No.: WO88/10403

PCT Pub. Date: Dec. 29, 1988

[30] Foreign Application Priority Data

Jun. 18, 1987 [FI] Finland .................. 872722

[51] Int. Cl.$^5$ ............................... G05D 7/06
[52] U.S. Cl. .................... 137/1; 251/129.01; 251/229; 137/624.11
[58] Field of Search .......... 137/486, 487.5, 1, 624.11, 137/14; 251/251, 228, 229, 129.01

[56] References Cited

U.S. PATENT DOCUMENTS

| | | |
|---|---|---|
| 619,718 | 2/1899 | Canady . |
| 2,154,523 | 4/1939 | Midyette, Jr. ............ 236/33 |
| 4,487,213 | 12/1984 | Gates ............... 137/486 X |
| 4,506,829 | 3/1985 | Grant ................... 236/49 |
| 4,633,900 | 1/1987 | Suzuki .............. 251/228 X |
| 4,658,855 | 4/1987 | Doyle ............. 137/486 X |
| 4,796,651 | 1/1989 | Ginn ............ 137/487.5 X |

FOREIGN PATENT DOCUMENTS

| | | |
|---|---|---|
| 1196710 | 11/1985 | Canada . |
| 2222127 | 11/1973 | Fed. Rep. of Germany . |
| 2519408 | 2/1976 | Fed. Rep. of Germany . |
| 34607 | 8/1961 | Finland . |
| 224315 | 1/1969 | Sweden . |
| 325457 | 6/1970 | Sweden . |

Primary Examiner—Alan Cohan
Attorney, Agent, or Firm—Steinberg & Raskin

[57] ABSTRACT

The invention concerns a procedure for controlling volumetric flow rate in air-conditioning installations, wherein the volumetric flow passing through an air-conditioning duct is controlled with the aid of a control (10) disposed in the air duct by opening or closing the control damper (11) or equivalent of the control (10). In the procedure, the control signal of the control damper (11) or equivalent air flow-controlling member of the control (10) is non-linearized on the basis of the effective characteristic curve of the control and of the desired effective characteristic curve. The opening and closing of the control damper or equivalent of the control is controlled with the aid of said non-linearized control signal function. The invention also concerns apparatus for controlling air flow.

5 Claims, 4 Drawing Sheets

PROCEDURE AND MEANS FOR CONTROLLING VOLUMETRIC FLOW RATE IN AIR-CONDITIONING INSTALLATIONS

BACKGROUND OF THE INVENTION

The present invention concerns a procedure for controlling volumetric flow rate in air-conditioning installations, in said procedure the volumetric flow in an air-conditioning duct being controlled with the aid of a control means disposed in the air duct by opening or closing the control damper of said control means.

A major drawback of control valves and control dampers installed in air-conditioning ducts is their poor controllability. When the damper is opened, the air quantity passing through the damper begins to increase steeply, and the increase of the air flow rate levels out when the control damper reaches its other extreme position. Often, however accurate air flow control is required, and precisely that kind of control in which exactly the desired volumetric flow rate is obtained with the control variable. Control damper designs of prior art enable no such operation; the operation of the valve is highly non-linear and therefore also frequently uncontrolled.

One of the most difficult present-day problems in air flow control is the control of great air flows. Most commonly a control damper provided with turnable slats is used to control air flows.

Air-conditioning systems have to be dimensioned and controlled so that no unnecessary loss of pressure occurs in the system. Major pressure drops cause noise problems in the duct system and require bigger and more powerful blowers, and stronger ducts. These facts directly increase the building and running costs of the installation and impair its comfort in use. The same facts also give rise to special requirements regarding the components of the duct system, e.g. the control dampers. The pressure drop problem is one of the reasons why the control dampers are constructed to be congruent with the duct systems of their nominal dimensions so that they might not cause any pressure drop when fully open. For this reason the control dampers are over-dimensioned from the viewpoint of control technology. Therefore their effective operational characteristic curve is also strongly non-linear and, furthermore, their effective control range is narrow. As a result of the non-linear effective characteristic curve, the change of the control damper's control variable (from 0 to 100%) will not alter the volumetric flow in the direct proportion: in the worst case the controlled volumetric flow rate may be a multiple of that which is desired.

SUMMARY OF THE INVENTION

The object of the invention is primarily an apparatus design and procedure design by which it becomes possible to alter the effective characteristic curve of the control damper in such manner that to a given change of control signal corresponds a given change of volumetric flow rate. Also an aim of the invention is an apparatus and procedure design by which it becomes possible expressly to linearize the opening of the control damper in such manner that to 0 to 100% control value change linearly corresponds to 0 to 100% volumetric flow rate change.

The aim of the invention is achieved with a procedure design which is mainly characterized in that in the procedure the control signal of the control damper or equivalent air flow-controlling member of the control means is non-linearized on the basis of the effective characteristic curve of the control means and the effective characteristic curve desired and with said non-linearized control signal function is controlled the opening and closing of the control damper or equivalent of the control means.

The apparatus of the invention is mainly characterized in that the means comprises a transformation unit connected to the action means moving the control damper or equivalent, with the aid of which the control signal meant for moving the control damper or equivalent is non-linearized on the basis of the effective characteristic curve of the control means and the desired effective characteristic curve, and in said means the opening or closing of the control damper or equivalent of the control means is controlled with the aid of said non-linearized control signal function.

BRIEF DESCRIPTION OF THE DRAWINGS

The invention is described in the following, referring to certain advantageous embodiments of the invention, presented in the figures of the attached drawings, yet to which the invention is not meant to be exclusively confined.

In the drawings.

DESCRIPTION OF THE PREFERRED EMBODIMENTS

The procedure and apparatus of the invention are applicable in air flow control. They are particularly suited to be used in controlling air flows in connection with control means that are used in air-conditioning installations, such as control dampers.

Figure 1A:
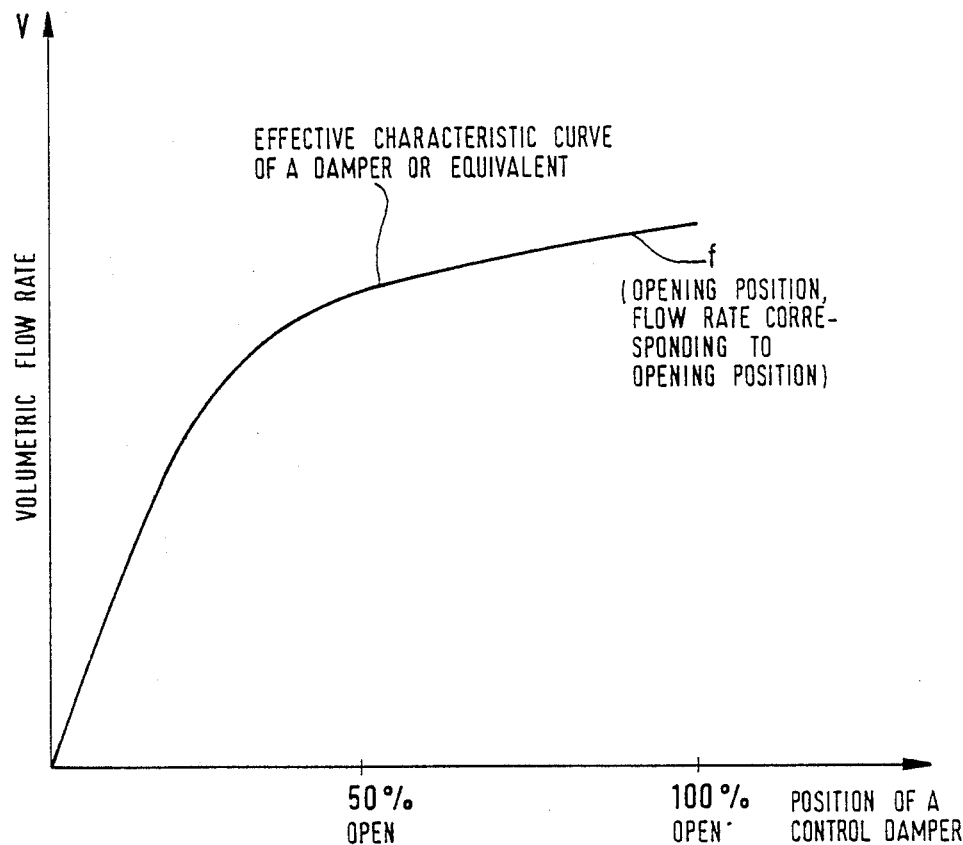
In FIG. 1A, a characteristic curve of a conventional non-linear control damper is graphically displayed.

In FIG. 1A is graphically displayed the characteristic curve of a conventional non-linear control damper. On the horizontal axis is plotted the control signal, or control variable, of the control damper, in per cent. On the vertical axis is plotted the controlled volumetric flow rate, or here the action variable.

Figure 1B:
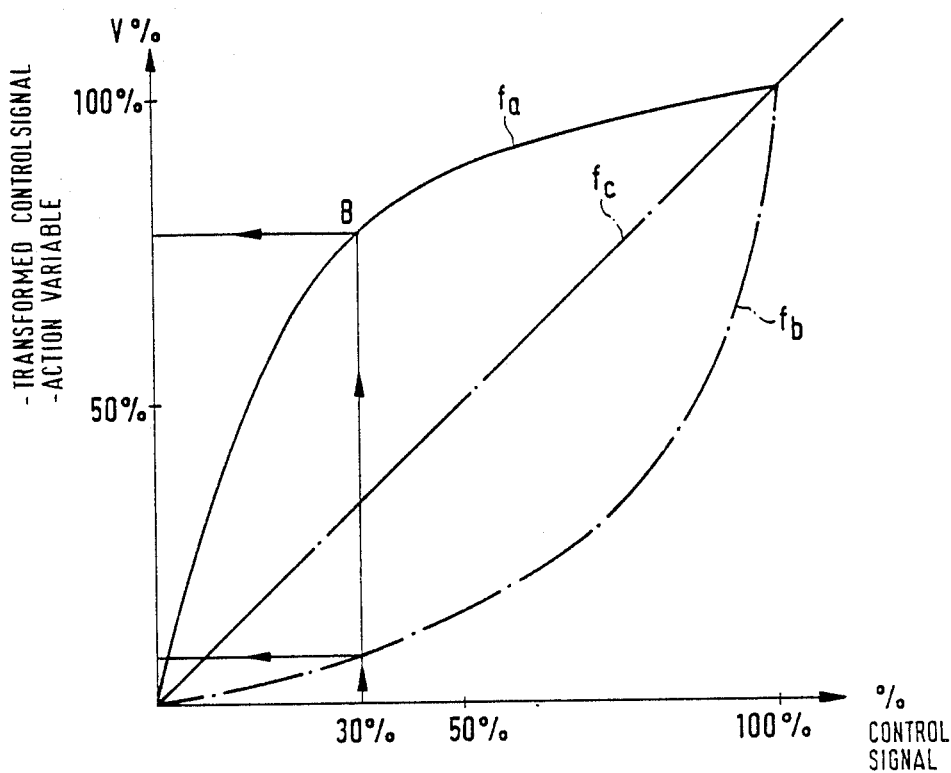
In FIG. 1B, the procedure of the invention is graphically displayed.

It is seen in the figure that when the control damper opens, the air quantity passing through the control damper increases strongly, and the increase of air flow levels out when the control damper reaches its extreme open position. In FIG. 1B has been plotted the characteristic curve of the transformed control signal, which is the inverse function of the effective characteristic curve of the control damper.

In FIG. 1B is illustrated, on an enlarged scale, the procedure principle of the invention. The coordination on the horizontal axis represent the original control signal in per cent, or the control variable. The vertical coordinates represent the transformed control signal, or the action variable. In the procedure of the invention, the controlled air flow rate is the action variable. In the procedure of the invention, the control signal is non-linearized inversely relative to the non-linearity of the effective characteristic curve of the action means employed and to the desired effective characteristic curve.

In FIG. 1B is presented one instance of control according to the invention. Desired is the volumetric flow rate $V'_1$, which is e.g. 30% of the maximum air flow. With a 30% control signal value is obtained, as the figure reveals, a volumetric flow rate of over 70%. The aim in linearizing is that 30% volumetric flow is reached expressly with 30% control signal, i.e., that the magnitude of the control signal is 30% of the total control variable range.

As shown in FIG. 1B, linearizing is accomplished by first forming for the effective characteristic curve fa of the action means the inverse function relative to the desired effective characteristic curve $f_c$. The graph $f_b$ representing this inverse function is the mirror image of the effective characteristic curve graph $f_a$ with reference to the curve $f_c$. The curve $f_b$ entered in the figure is thus obtained. The figure reveals that when 30% volumetric flow rate is to be obtained with 30% control signal, the control signal should have the magnitude indicated by the ordinate of the point B on the inverse function graph fb, or about 10%.

In FIG. 1B the vertical coordinate also represents the transformed control signal, in per cent. The desired linear effective characteristic curve of the control damper has been entered in FIG. 1B and indicated with the symbol $f_c$.

Figure 2A:
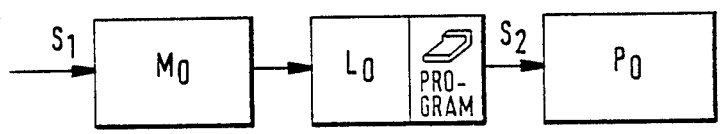
In FIG. 2A, an electrical implementation of the procedure of the invention is presented in the form of a block diagram.

In FIG. 2A is in the form of a block diagram showing the way in which the procedure of the invention is electrically implemented. In the figure, the first block has been denoted with $M_o$, the second block with $L_o$, and the last block with $P_o$. The original electric control signal is carried to the electromotor control unit $M_o$, which performs modulation of the original control signal $S_1$ in the electrical transformation unit $L_o$ in such manner that the curve of the non-linearized control signal consistent with the shape of the effective characteristic curve of the control damper or equivalent means is formed. The transformation unit produces the transformed control signal $S_2$, by which the rotating axis $11a$ or equivalent of the control damper 11 is moved. In the linearized model said non-linearized control signal curve is the inverse function of the effective characteristic curve of the control means, and it yields that control signal value at which to a given per cent original control signal value corresponds to the value of the action variable having the respective percentage, this being in the present embodiment expressly the volumetric air flow rate $V'$ which is to be controlled. The non-linearization can be implemented in the electrical procedure, by analog or digital techniques or by a combination of these.

The electrical procedure is also characterized in that to it may be supplied the actual effective characteristic curve and the desired effective characteristic curve, in the procedure further on their basis being determined the non-linearizing function.

As taught by the invention, one may particularly in the electrical procedure apply different non-linearizing functions. In order to carry out a given, and desired, transformation, the user may select the non-linearizing function curve he desires from among various, predefined such curves stored in a computer memory. The user may also exert an influence with the aid of the connection associated with the control damper, directly on the non-linearity of the control signal. The user may tune the non-linearity curve to conform to the system that is being controlled by means of such parameters which have been measured on the system that is being controlled and which have been supplied to the non-linearizing unit. Particularly in the electrical procedure, one may determine the effective characteristic curve (function) of the control means meant to be installed in the air-conditioning duct, which includes as variables the position of the control damper of the control means and the volumetric flow rate therewith obtained. Hereafter, the curve shape of the desired effective characteristic curve can be entered in the microprocessor, and the microprocessor or equivalent will on the basis hereof determine the non-linearity curve.

Figure 2B:
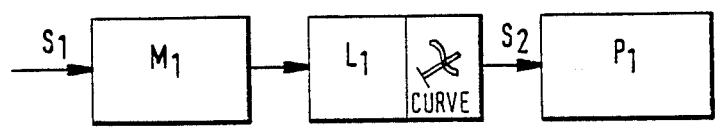
In FIG. 2B, a mechanical implementation of the procedure of the invention is presented in the form of a block diagram.

In FIG. 2B is presented, in block diagram illustration, a mechanically implemented modification of the action means controlling the opening of the control damper. This modification can implement linear opening of the control damper or any desired non-linear opening of the control damper.

The control signal $S_1$ is carried, in the mechanical design, e.g. in the form of a rotation of the shaft of a gear wheel. This mechanical transmission has been indicated with $M_1$. Between the shaft $11a$ of the control damper and the mechanical transmission $M_1$ has been connected a mechanical modulator $L_1$, for instance a cam wheel, which transforms the control signal $S_1$ taken to the unit $M_1$ to a control signal $S_2$, by which the control damper 11 is opened and closed by moving its shaft $11a$ or equivalent.

In the mechanical procedure various non-linearizing curves prepared in advance may be provided, from which the appropriate curve is selected in each instance. It is thus possible with the procedure and apparatus of the invention to achieve any desired control of the control damper including non-linear control if desired.

Figure 3A:
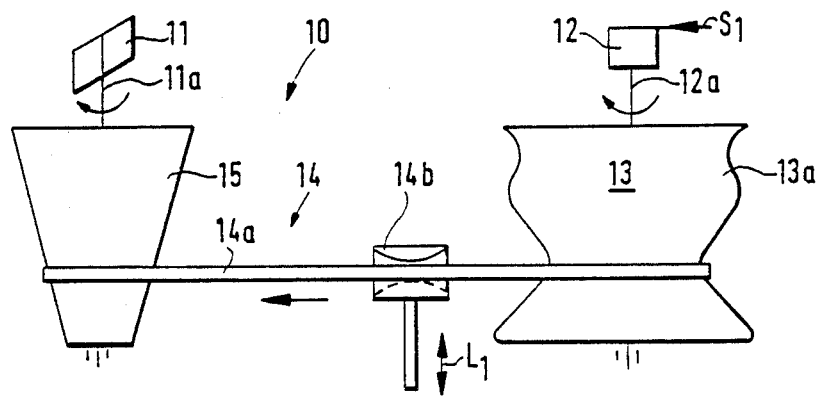
In FIG. 3A is presented an advantageous mechanical embodiment of the apparatus of the invention.

As shown in FIG. 3A, a given control variable is carried to the electromotor 12. The quantity of the control variable may for instance be p % of the total control variable quantity. Linear opening of the control damper 11 is desired and it should be such that in correspondence to a control variable quantity of a given percentage an air flow rate amounting to the desired percentage will be obtained.

As shown in FIG. 3A, this is implemented in that on the shaft $12a$ of the electromotor 12 has been connected a cylindrical body 13 presenting a curved surface $13a$ and a belt transmission 14 is employed to transmit the rotation further to the shaft $11a$ of the control damper 11 in the control means 10, over its cooperating pulley 15. The belt $14a$ is shifted, in order to implement the desired linearization, with a shifter $14b$ along the surface $13a$ and $15a$ (arrow $L_1$) of the cylindrical body 13 and 15, said surface having been shaped so that the desired linearization or non-linearization will be implemented so that correspondence is obtained between any given control variable and the desired magnitude of air flow passing through the valve or control damper 11.

Figure 3B:
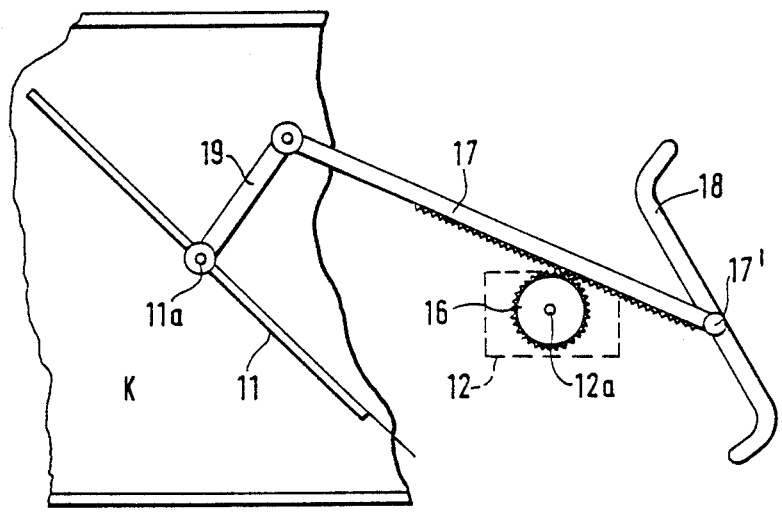
In FIG. 3B is presented another advantageous embodiment of the means of the invention; and In FIG. 3C is presented a third advantageous mechanical embodiment of the means of the invention.

FIG. 3B is presented another implementation of the mechanical linearizing according to the invention. The shaft $12a$ of the motor 12 has been fitted with a pinion 16, which further moves a rack 17. One end of said rack 17 has been disposed to move, with the aid of a follower member 17', in a slide groove 18 of which the shape corresponds to the non-linearization curve. It is thus achieved that the movement is transmitted from the rod 17 coupled with the pinion 12 further over an intermediate link 19 to the shaft 11a of the damper or slat 11 in the duct K. Any desired transformation is achieved by changing the shape of the curve 18, and for instance linearizing of a control damper may thus be implemented.

Figure 3C:
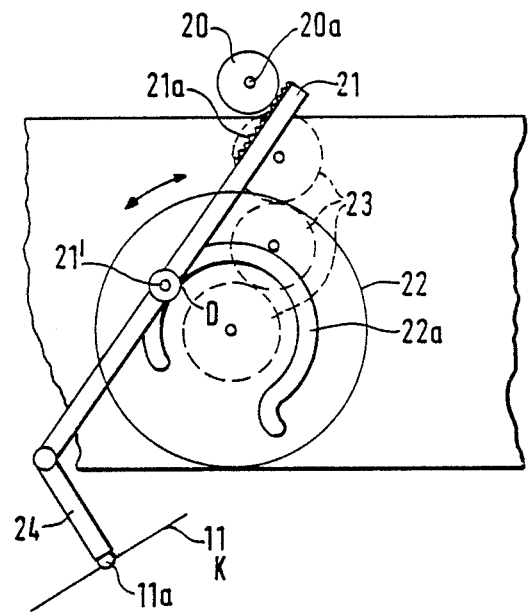

In FIG. 3C is presented a third apparatus design implementing the procedure, implemented mechanically according to the invention. The action variable is carried over the shaft 20a of the pinion 20 to the rack 21. The pinion 20 has been arranged to cooperate with the teeth 21a on the tooth rack 21. The rack 21 further cooperates with a cam wheel 22 which has been disposed to rotate by deriving its rotation from the pinion 20 over transmissions, advantageously intermediate gears 23. Therefore the point of contact D between the sliding surfaces of the cam 22a on the cam wheel 22 and the follower member 21' of the rack 21 will move along the cam and the movement of the pinion 20 is thus transmitted in a way dependent on the shape of the cam 22a on the cam wheel 22, further over the lever 24, to the shaft 11a of the control damper 11 or equivalent. Any desired control is achieved by changing the shape of the non-linearizing curve groove or equivalent.

The procedure of the invention may equally be applied in those control designs in which the force transmitted to the shaft of the control damper is controlled. When the control damper is closed, the force requirements when the control damper is now opened are higher than those in any other instance of control. Therefore a higher opening force can be directed on the control damper, by applying the transformation of the invention, in those instances when one starts to move the control damper from its closed position to its open position, or vice versa. The highest torque or force requirement is encountered precisely at the stage when the surfaces of the control damper meet the cooperating surfaces of the duct or of the cooperating member thereto connected.

We claim:

1. Procedure for controlling volumetric flow rate in an air-conditioning installation, wherein the volumetric flow passing through an air-conditioning duct is controlled with the aid of control means (10) disposed in the air duct, by opening or closing a control damper (11) or equivalent air flow-controlling member of the control means (10), comprising the steps of non-linearizing, by a method comprising selecting a non-linearizing function curve from a plurality of non-linearizing function curves within a computer memory, said non-linearizing function curves each being a plot of a control variable versus a control volumetric flow rate of said air-conditioning installation, a control signal of the control damper (11) or equivalent air flow-controlling member of the control means (10), on the basis of an effective characteristic curve of the control means, said effective characteristic curve being a plot of a control variable of said control damper versus a control volumetric flow rate of said air-conditioning installation when said damper is connected as an integral part of said air-conditioning installation and said effective characteristic curve being a function of physical characteristics of said damper and of other elements of said air-conditioning installation to achieve a desired effective characteristic curve, said desired effective characteristic curve being a desired plot of a control variable of said control damper versus a control volumetric air flow rate of said air-conditioning installation, and controlling opening and closing of the control damper or equivalent member of the control means with the aid of said non-linearizing step.

2. The procedure of claim 1, comprising the additional step of linearizing the opening of the control damper (11) of the control means (10), by transforming the control function of the control signal into an inverse function of the effective characteristic curve of the control means relative to the desired effective characteristic curve by selecting an appropriate said non-linearizing function curve from said computer memory.

3. The procedure of claim 1, comprising the additional step of exerting influence on the non-linearity of the control signal by means of appratus connected to the control damper (11).

4. The procedure according to claim 1, comprising the additional step of tuning the non-linearity curve to conform to a system to be controlled, with parameters which have been measured in the system to be controlled and which have been supplied to the non-linearization.

5. Apparatus for controlling volumetric flow rate in an air-conditioning installation, wherein the volumetric flow is controlled by opening or closing a control damper (11) of control means (10), comprising a transformation unit comprising a computer having a plurality of non-linearizing function curves within its memory, said non-linearizing function curves each being a plot of a control variable versus a control volumetric flow rate of said air conditioning apparatus, action means connected to an output of said transformation unit and functioning to move said control damper (11) or equivalent member, said transformation unit generating a control signal for moving through said action means said control damper (11) or said control member, said control signal being non-linearized on the basis of an effective characteristic curve (fa) of said control means to achieve a desired characteristic curve (fc), and said effective characteristic curve being a plot of a control variable of said control damper versus a control volumetric flow rate of said air-conditioning installation when said damper is connected as an integral part of said air conditioning installation and said effective characteristic curve being a function of physical characteristics of said damper and of other elements of said air-conditioning installation and desired effective curve being a plot of a control variable of said damper versus a controlled volumetric flow rate of said air-conditioning installation, and in said means, opening and closing of said control damper (11) or member of said control means (10) being controlled with the aid of said non-linearized control function (fb).

* * * * *